(12) United States Patent
Rusch et al.

(10) Patent No.: US 12,338,862 B2
(45) Date of Patent: Jun. 24, 2025

(54) BOOSTER CLUTCH WITH A ROTATIONAL AXIS FOR A DRIVE TRAIN

(71) Applicant: Schaeffler Technologies AG & Co. KG, Herzogenaurach (DE)

(72) Inventors: Alain Rusch, Gambsheim (FR); Martin Häßler, Graben-Neudorf (DE); Sebastian Kaiser, Starkenburg (DE); Marc Finkenzeller, Gengenbach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 18/690,579

(22) PCT Filed: Sep. 14, 2022

(86) PCT No.: PCT/DE2022/100676
§ 371 (c)(1),
(2) Date: Mar. 8, 2024

(87) PCT Pub. No.: WO2023/046233
PCT Pub. Date: Mar. 30, 2023

(65) Prior Publication Data
US 2024/0376940 A1 Nov. 14, 2024

(30) Foreign Application Priority Data
Sep. 21, 2021 (DE) .................. 10 2021 124 323.8

(51) Int. Cl.
*F16D 13/06* (2006.01)
*F16D 21/08* (2006.01)
(Continued)

(52) U.S. Cl.
CPC ............. *F16D 13/06* (2013.01); *F16D 21/08* (2013.01); *F16D 23/12* (2013.01); *F16D 43/211* (2013.01); *F16D 2023/123* (2013.01)

(58) Field of Classification Search
CPC .......... F16D 13/04; F16D 13/06; F16D 13/48; F16D 13/54; F16D 21/08; F16D 23/12;
(Continued)

(56) References Cited

U.S. PATENT DOCUMENTS 2,919,000 A 12/1959 Claytor
3,037,586 A 6/1962 Modersohn
(Continued)

FOREIGN PATENT DOCUMENTS

AU 2013267046 A1 7/2014
CN 115030967 A 9/2022
(Continued)

*Primary Examiner* — Richard M Lorence

(57) ABSTRACT

A booster clutch includes a pilot-control clutch, a booster output side, a booster input side, a rocker element, a first energy storage element and a drum. The pilot-control clutch has a friction pack and a torque is frictionally transmittable when the friction pack is in a pressed state. The booster output side is torsionally fixed to a pilot-control input side and the booster input side is arranged to be torsionally fixed to an input shaft. The first roller is arranged via a ramp pairing between the rocker element and the booster input or output side. The first energy storage element is arranged between the rocker element and the booster output or input side, or is arranged to transmit a radial force to the rocker element. The first roller applies a predetermined torque over the booster input and output side, and presses the rocker element radially against the drum.

14 Claims, 3 Drawing Sheets

(51) Int. Cl.
*F16D 23/12* (2006.01)
*F16D 43/21* (2006.01)

(58) Field of Classification Search
CPC ... F16D 2023/123; F16D 43/21–43/216; F16F 15/1205
USPC .......................................................... 192/35
See application file for complete search history.

(56) References Cited

U.S. PATENT DOCUMENTS

| | | |
|---|---|---|
| 4,069,901 A | 1/1978 | Sessler |
| 8,522,947 B2 | 9/2013 | Komai et al. |
| 2008/0073170 A1 | 3/2008 | Matsumoto |
| 2012/0241275 A1* | 9/2012 | Simon ..................... F16D 13/04 |
| | | 192/35 |
| 2019/0128341 A1 | 5/2019 | Ohr et al. |
| 2020/0292011 A1* | 9/2020 | Trinkenschuh ........ B60K 17/02 |

FOREIGN PATENT DOCUMENTS

| | | | |
|---|---|---|---|
| DE | 102010048828 A1 | 5/2011 | |
| DE | 102014210976 A1 | 12/2015 | |
| DE | 102016209019 B3 * | 5/2017 | ............. B60K 6/387 |
| DE | 102016210521 A1 | 12/2017 | |
| JP | S62233524 A | 10/1987 | |
| JP | H06280901 A | 10/1994 | |
| JP | 2019064290 A | 4/2019 | |

* cited by examiner

BOOSTER CLUTCH WITH A ROTATIONAL AXIS FOR A DRIVE TRAIN

CROSS-REFERENCE TO RELATED APPLICATIONS

This application is the United States National Phase of PCT Appln. No. PCT/DE2022/100676 filed Sep. 14, 2022, which claims priority to German Application No. DE102021124323.8 filed Sep. 21, 2021, the entire disclosures of which are incorporated by reference herein.

TECHNICAL FIELD

The present disclosure relates to a booster clutch with a rotational axis for a drive train. The present disclosure further relates to a drive train and a motor vehicle with such a drive train.

BACKGROUND

Self-reinforcing clutches (what are termed booster clutches) are known from the prior art, by means of which the torque transmission can take place between, for example, an internal combustion engine and a transmission. Such a booster clutch makes it possible to transmit a large amount of torque with a (too) low contact pressure or control pressure. For this purpose, some of the torque to be transmitted is converted into a pressing force. Such booster clutches have, for example, leaf spring systems or ball ramp systems, with a torque being built up by means of a pilot-control clutch and then (at least some of) this torque being converted into an axial pressing force. In a ball ramp system, two ramp disks are rotated against each other as a result of the applied torque, thereby generating an axial path and thus an axial force, which is used as a reinforcing pressing force. In a leaf spring system, the leaf springs are positioned under the applied torque with the same result as with the ball ramp system.

The known designs have a large axial installation space. However, it is desirable that the (self-reinforcing) clutch can be integrated into the drive train, for example between the internal combustion engine and a transmission, for example in a hybrid module, in an installation space-neutral manner and with as little structural intervention as possible.

SUMMARY

The present disclosure relates to a booster clutch with a rotational axis for a drive train. The booster clutch includes: a pilot-control clutch with a friction pack, the friction pack having a pilot-control input side and a pilot-control output side, and, in a pressed state between the pilot-control input side and the pilot-control output side, a torque can be transmitted in a frictional manner: a booster output side that is connected to the pilot-control input side in a torsionally fixed manner: a booster input side that can be connected to an input shaft in a torsionally fixed manner; at least one rocker element, which is arranged in a torque-transmitting manner in the torque flow between the booster input side and the booster output side; at least one roller, which is arranged in a torque-transmitting manner via a ramp pairing between a corresponding one of the rocker elements and the booster input side or the booster output side; and at least a first energy storage element. The at least one first energy storage element either: is arranged in a torque-transmitting manner between a corresponding one of the rocker elements and the booster output side or the booster input side; or is arranged to transmit radial force to the at least one rocker element.

The booster clutch also includes a drum and, when a predetermined torque is applied across the booster input side and the booster output side as a result of a rolling of the at least one roller on the ramp pairing, the at least one rocker element is pressed radially against the drum.

In the following, reference is being made to the stated rotational axis when the axial direction, radial direction or the direction of rotation and corresponding terms are used, unless explicitly stated otherwise. Unless explicitly stated otherwise, ordinal numbers used in the preceding and subsequent description are used only for the purposes of clear distinction and do not indicate an order or a ranking of designated components. An ordinal number greater than one does not necessarily mean that a further such component must be present.

As is known in principle, the booster clutch proposed here is designed for the reinforceable transmission of a torque about a rotational axis for use in a drive train. It should be noted again that the actuating force for generating the pressing force for frictionally transmitting a predetermined (total) torque is insufficient, for example so only 20% [twenty percent] to 30% of the predetermined (total) torque can be transmitted. This actuating force or this control pressure is used for the pilot-control clutch. The further pressing force is derived from the applied (total) torque that is to be transmitted. For controllability, the pilot-control clutch is a friction clutch, which can be adjusted to a slip limit via the pressing force (or actuating force). For example, when restarting an internal combustion engine (overrun), the pilot-control clutch (and the drum, see below) is operated at the slip limit. The actuating force is referred to here as the force which is transmitted from a slave system, for example a slave piston in a hydraulic or pneumatic system or a release ring or engagement ring (possibly via a diaphragm spring) to a (pilot-control) contact plate. The pressing force is the force that is applied directly over the friction partners of the pilot-control clutch. A gradient of the pressing force across the transmission path is thus neglected or an average of the pressing force that is effective for the (maximum) transmittable torque is considered.

The booster clutch proposed here accordingly includes a pilot-control clutch with a friction pack. The friction pack includes a pilot-control input side and a pilot-control output side, which can be pressed together in a grinding (or slipping) manner with a torque that can be controlled via an axial pressing force and therefore a torque can be transmitted purely by friction. The (current) maximum transmittable torque results from the product of the (currently) applied pressing force, the average radius of the friction surface and the (possibly variable, i.e., current) coefficient of friction.

In one embodiment, the pilot-control clutch has, for example, a pilot-control contact plate, a pilot-control counter-plate and a (pilot-control) friction disk, which can be pressed together by means of an axially acting pressing force. In another embodiment, a plurality of friction disks and a corresponding number of intermediate plates are provided. Alternatively or additionally, the friction pack is designed as a disk pack. In another embodiment, the pilot-control clutch is designed in the manner of a drum brake with a friction drum and at least one contact block and thus a radially acting pressing force.

In one embodiment, the pilot-control input side is formed by the at least one pilot-control friction disk or the friction drum. The pilot-control output side is then formed by the pilot-control counter-plate and the pilot-control contact plate or by the at least one contact block.

When in use, the pilot-control output side of the friction pack is connected in a torsionally fixed manner to an output, for example a transmission input shaft (e.g., directly), for example by means of a (plug-in) toothing. Alternatively or additionally, the pilot-control output side is connected in a torsionally fixed manner to a rotor shaft of an electric drive machine, for example in a hybrid module, preferably via the co-rotating clutch cover of the pilot-control clutch.

As already explained above, an actuating device is provided for axially actuating the friction pack, i.e., for applying a pressing force to the friction pack, the friction pack being transferable from a normal position (open in a normally open configuration) to the actuated position (closed in a normally open configuration) by means of the actuating force. If there is no sufficient actuating force, the friction pack is (passively) returned to the normal position, for example with the aid of an antagonistic energy storage element, for example at least one leaf spring.

In one embodiment, the booster clutch is designed to be wet. In the wet embodiment, the frictional heat introduced can be easily dissipated and the construction volume can therefore often be reduced. In another embodiment, the booster clutch is designed to be dry. In the dry embodiment, the booster clutch can be arranged outside the transmission housing and can be manufactured inexpensively compared to a wet booster clutch. This means that the coefficient of friction (with sufficient cooling) is within a very narrow tolerance window and the friction torque is almost force-proportional between a separated and a pressed state.

The booster clutch also has a booster output side, which is connected in a torsionally fixed manner to the pilot-control input side. The booster output side is formed, for example, by at least one disk segment-like or disk-like component. In one embodiment, the booster output side and the pilot-control input side are formed separately and are connected in a torsionally fixed manner, for example via a toothing on a common shaft, by means of a rivet connection and/or a screw connection. In one embodiment, the booster output side and the pilot-control input side are arranged axially next to each other. In another embodiment, the booster output side and the pilot-control input side are arranged in an axially overlapping manner, preferably formed in one piece with one another.

Furthermore, a booster input side is provided, which is connected to an input shaft in a torsionally fixed manner during use, for example by means of a plug-in toothing, pressing and/or screw connection. For example, the input shaft is an internal combustion engine shaft of an internal combustion engine.

In one embodiment, the booster input side forms the torque input side in a main state (when used in a motor vehicle, for example a traction torque transmission). In one embodiment, the booster output side forms the torque input side in a secondary state (when used in a motor vehicle, for example an overrun torque transmission). Alternatively, this is the other way around.

The booster input side is formed by at least one disk segment-like or disk-like component. In an example embodiment, the booster input side has two disks, with at least one of the disks being connected in a torsionally fixed manner to the input shaft. The two disks are then, for example, axially spaced apart, for example by means of spacer bolts, and are connected in a torsionally fixed manner. In an example embodiment, the booster output side is arranged axially between the two disks of the booster input side. Alternatively, this is the other way around.

The booster clutch further has at least one rocker element, e.g., two or three rocker elements, and the at least one rocker element is arranged in a torque-transmitting manner in the torque flow between the booster input side and the booster output side. The at least one rocker element is movable both relative to the booster input side and relative to the booster output side.

The at least one rocker element is formed like a disk or like a disk segment and is connected directly in a torque-transmitting manner to the booster input side (according to the above example, to one of the disks, e.g., to both disks) by means of at least one (first) roller and/or by means of at least one (first) energy storage element. The at least one rocker element is further connected directly in a torque-transmitting manner to the booster output side by means of at least one roller (different to the second one mentioned above) and/or by means of at least one energy storage element (different to the second one mentioned above).

The rocker element is supported by itself or on an adjacent rocker element by means of at least one energy storage element, for example an arc spring, a helical compression spring (with, for example, a straight spring axis), a leaf spring, a gas pressure accumulator or the like. The energy storage element is supported in a force-transmitting or torque-transmitting manner on a corresponding. e.g., single-piece, connecting device of the associated rocker element.

In an embodiment with rollers provided on the input side and output side of the rocker element, the at least one rocker element is supported on the booster input side and on the booster output side by means of the rollers connected in series. The rocker element has a rocker track for each of the rollers, and a complementary counter-track for the same (associated) roller is formed in each case on the booster input side and on the booster output side. The complementary counter-track is formed by the booster input side or by the booster output side, e.g., in one piece. A torque is transmitted via the counter-track and rocker track, which form a ramp pairing.

In an embodiment with rollers (track side) provided only on the input side or only on the output side of the rocker element, a force side is formed on the other side of the rocker element in that the rocker element is supported directly by means of an energy storage element on the booster side. The force side may be formed on the input side and the track side may be formed on the output side. The track side is designed as defined above with at least one roller and a corresponding ramp pairing.

On at least one (e.g., a single, output) side of the rocker elements, the ramp pairing is designed as a transmission-ratio pairing. This means that a forced revolving movement of the transmission-ratio rollers results in a radial (e.g., inward) movement of the rocker element. If, for example, a torque is introduced, for example from the booster input side, the rollers on the rocker track and the complementary counter-track are rolled (up) from a rest position in the corresponding direction on the ramp-like rocker track as a result of the applied torque (in the case of a pilot-control clutch which transmits frictional force, for example which is closed). A rolling-up is used here merely for illustration to designate the fact that work is being done. More precisely, because of the geometric relationship, an opposing force of the energy storage element is overcome. Rolling down means dispensing stored energy from the energy storage element in the form of a force on the associated rocker element. Up and down do not necessarily correspond to one spatial direction, not even in a co-rotating coordinate system.

With this torque-related movement, the rollers force the associated rocker element to move relative to the booster input side and the booster output side, and the energy storage element, which acts antagonistically, is tensioned accordingly.

The force is absorbed by the correspondingly designed energy storage element in the form of compression, expansion, torsion or other energy storage, and is passed on with a time delay, e.g., (almost) dissipation-free, to the other side, here for example the booster output side. The torque input, here for example the booster input side, including the torsional vibration, is thus passed on, e.g., (almost) without loss, in a manner changed over time, here for example to the booster output side.

Two energy storage elements may be provided to act on a (single) rocker element, the energy storage elements being arranged antagonistically with respect to each other and, for example, being balanced with each other in accordance with the embodiment of the rocker tracks and complementary counter-tracks. In an alternative embodiment, at least one constraining guide is provided, by means of which a movement is imposed in a geometrically guided manner at least on one of the rocker elements, for example in the manner of a rail or groove and an encompassing pin or spring engaging therein.

The at least one energy storage element acts on the associated rocker element with a force direction having a vector component in the circumferential direction. The circumferential direction is defined on a circle concentric to the rotational axis. In one embodiment, the circumferential direction is constantly oriented via a movement of the associated rocker element, moving on a constant circle or oriented constantly or moving on a changing circle. The circle is at least large enough to touch the rocker element, e.g., large enough so that the circle intersects a contact point or contact surface at which point the forces are transmitted between the relevant energy storage element and the associated rocker element.

One circumferential direction is oriented perpendicular to a radius with the rotational axis as the center. The underlying radius intersects the contact point or the contact surface of the energy storage element and the rocker element. This results in a direction of force on the rocker element with a large vector component in the circumferential direction, e.g., with a vector component in the circumferential direction which is larger than the vector component in the radial direction. This means that the force on the rocker element is not purely radially oriented, but is exclusively (at the contact point) tangential to the circumferential direction or with a radial vector component and with a (at the point of contact) tangential vector component. This results in a direction of force which can be transferred into the same rocker element (from the other side), for example by means of a helical arc spring, or into the adjacent rocker element approximately in the circumferential direction. This enables, for example, a deflection additionally or exclusively in the circumferential direction instead of a deflection (or vibration) of the energy storage element exclusively in the (radial) transverse direction.

In an example embodiment, the rocker element is supported in an inadequately defined manner via the rollers, for example only supported in a radially defined manner, and the at least one energy storage element defines the movement as a result of the force introduction direction, for example exclusively in the circumferential direction. Alternatively, an additional guide is provided for the rocker element.

In an embodiment of the rocker element with a force side, i.e., an energy storage element on one side of the rocker element to the booster output side or booster input side or a roller with a ramp pairing without the property of a transmission-ratio pairing, and a track side, a transmission-ratio pairing is formed as described above by the ramp pairing of the track side. The force side is in the torque flow. However, this does not immediately result in a radial movement of the rocker element. Rather, a force transmission acting (approximately) purely in the direction of rotation is formed.

In one embodiment, at least one of the rocker elements (e.g., all rocker elements) is arranged axially between and radially overlapping with the booster input side. In an alternative embodiment, a rocker element includes a pair of disks and the booster input side (for example a single disk) is arranged axially between the pair of disks of the at least one rocker element.

It should be noted that the torsionally fixed connection of the booster input side and the booster output side is formed either radially centrally or radially externally. In an embodiment for a small installation space, the booster input side is connected radially centrally to the input shaft and the booster output side is connected radially externally to the pilot-control input side in a torsionally fixed manner.

It is now suggested here that the booster clutch has a drum. The drum is coaxial with the rotational axis and is designed with a suitable axial extension. In one embodiment, the drum is arranged radially outside the at least one rocker element: in another embodiment, the drum is arranged radially inside the rocker element. The drum and the at least one rocker element are arranged to overlap axially.

If a predetermined torque is applied across the booster input side and the booster output side due to a friction torque on the pilot-control clutch, the at least one roller is rolled from a rest position in the corresponding direction on its ramp pairing forming a transmission path. Because this force acting in the direction of rotation is translated into a radial movement by the transmission path, the at least one rocker element is pressed radially against the drum as a result of the rolling of the roller. The antagonistic force of the at least one energy storage element is therefore overcome and the rocker element (in one embodiment in the manner of a brake block) is pressed radially against the drum. This means that the at least one rocker element and the drum form a further torque-transmitting clutch (as a drum clutch) which is connected in parallel with the pilot-control clutch. This parallel-connected (drum) clutch only closes when the friction pack of the pilot-control clutch is closed and there is sufficient torque for closing over the booster input side and the booster output side. If the latter is not the case, the (maximum) torque that can be transmitted from the pilot-control clutch alone is more than sufficient.

The (radial) pressing force, required for a desired (maximum) transmittable torque, between the drum and the at least one rocker element is provided by a portion of the applied torque over the booster input side and the booster output side by means of the transmission path. The drum and the at least one rocker element are configured for a pure frictional connection, a pure interlocking connection (non-round cross-section, for example a toothing) or an at least initial frictional connection and an at least subsequent interlocking connection, for example by means of a cone with a non-round cross-section (for example approximately triangular with rounded corners, as is known, for example, from what is termed a wedge clutch).

It should be noted that with the booster clutch proposed here, not only a very small construction volume can be achieved, but also an almost hysteresis-free torque transmission can be achieved. This results primarily from a (slip displacement which is at least almost negligible over a desired service life as with a conventional friction clutch, for example) slip-free force transmission between the roller, the rocker element and the corresponding booster side, i.e., a pure rolling of the roller within the ramp pairing.

In one embodiment, two or more rocker elements are provided, which may be arranged to be rotationally symmetrical with respect to the rotational axis, so that the booster clutch is balanced with simple means. For a small number of components and (transmission) paths, an embodiment with exactly two rocker elements is possible. For a small radial component in the at least one energy storage element when force is applied to the rocker element, an embodiment with exactly three rocker elements is possible.

In an example embodiment, at least one of the following components or at least one of the components of one of the following assemblies is manufactured as a sheet metal part, e.g., by means of punching and/or sheet metal forming and can therefore be produced particularly cost-effectively in large quantities: a pilot-control counter-plate, a pilot-control contact plate, a booster output side, a booster input side, the at least one rocker element and a co-rotating clutch cover.

It is further proposed in an example embodiment of the booster clutch that the drum is connected to the pilot-control output side in a torque-transmitting manner, and may be formed in one piece with a pilot-control output component. In this embodiment, the drum is not connected separately from the pilot-control clutch to the output of the booster clutch in a torque-transmitting manner, but is connected indirectly or directly in a torque-transmitting manner to the pilot-control output side. For example, the drum is formed separately from the pilot-control output side and is connected to it in a torque-transmitting manner, for example via a plug-in toothing, screw connection or rivet connection.

In an example embodiment, the drum is formed in one piece by a pilot-control output component, for example by the pilot-control counter-plate, and the drum is arranged to overlap axially with the friction pack on the pilot-control input side. The torque transmitted from the drum is therefore transmitted in parallel with the torque between the pilot-control input side and the pilot-control output side.

It is further proposed in an example embodiment of the booster clutch that the drum can be directly connected to the output, e.g., formed in one piece with the output.

In an alternative embodiment, the drum is directly connected to the output in a torsionally fixed manner or is formed in one piece with it. This has the advantage that the rigidity chain of the pilot-control clutch and the drum clutch (drum and rocker element(s)) which are connected in parallel to one another are separate from one another and can each be designed independently of one another.

It is further proposed in an example embodiment of the booster clutch that the at least one rocker element has a force side and a track side, and the track side includes the at least one second roller with a transmission-ratio ramp pairing. The force side may be arranged on the input side of the rocker element, and/or the force side may include a first roller for the radially neutral transmission of a force in the direction of rotation.

Previously known designs of self-reinforcing clutches, as mentioned above, are often difficult to control, such that there are delays in the closing and opening processes and undesirable vibrations also occur in the drive train.

It is now proposed here that one side of the rocker element is a force side, as already explained at the outset. Such a force side has the task of transmitting the force between the rocker element and the corresponding booster side independently from the (radial) position of the rocker element.

For example, a radially oriented elongated hole or a radially oriented track is formed with a (first) roller in the force side in the booster side (for example a disk) and on the rocker element. This means that a force in the direction of rotation can be transmitted to the force-side booster side regardless of the radial relative position of the rocker element imposed as a result of the ramp pairing of the (second) roller acting as a transmission path. In one embodiment, a radially neutral force transmission is achieved, but at the same time a ramp pairing that reinforces the direction of rotation is maintained, and, in addition to a relative torsion angle between the booster input side and the booster output side, a relative torsion angle between the corresponding booster side and the rocker element is also produced in a superimposed manner. This superimposed torsion angle is dependent on the magnitude of the relative radial displacement of the rocker element with respect to the booster sides as a result of the rolling of the second roller on the transmission-ratio ramp pairing (track side).

Alternatively or additionally, a (first) energy storage element is provided, which can be displaced for example in the radial direction or tilted about an axis parallel to the rotational axis of the booster clutch, such that a radially neutral force transmission between the relevant booster side and the force side of the rocker element is ensured.

In an example embodiment, the force side is formed between the rocker element and the booster input side, i.e., on the input side. This means that possible jamming can be avoided without further measures and using simple means. This not only makes it possible to achieve an almost hysteresis-free torque transmission, but also when the direction of the torque transmission changes (for example, when used in a motor vehicle, a change between traction torque and overrun torque), only a negligible delay is generated. This also means that the maximum transmittable torque can be controlled constantly and in every state. Since the pilot-control clutch can be continuously controlled between an open state and a closed state, the pressing force on the drum, which comes from the ramp pairing and the at least one rocker element, is also continuously controlled. In previously known concepts, however, the reinforcing clutch connected downstream of the pilot-control clutch is only opened again with a large opposing torque. There is therefore no continuously variable controllability of the reinforcing clutch.

It is further proposed in an example embodiment of the booster clutch that at least one second energy storage element is provided, which is arranged in a torque-transmitting manner between the booster input side and the booster output side.

In this case, at least a second energy storage element, for example an arc spring, a helical compression spring (with, for example, a straight spring axis), a leaf spring, a gas pressure accumulator or the like, is provided, which is arranged in a torque-transmitting manner between the booster input side and the booster output side. Here, torsional vibrations occurring, for example from an internal combustion engine, can be reduced by means of the at least one second energy storage element. In an example embodiment, at least two second energy storage elements are provided, e.g., for one embodiment comprising at least one helical compression spring with a straight spring axis, three or more second energy storage elements. For many applications, two or more helical compression springs may be radially one inside the other, which together form a second energy storage element.

To support the at least one energy storage element, the booster input side and the booster output side may have a corresponding, e.g., one-piece, connecting device, for example a contact surface and/or a rivet point. If a change in the applied torque and an accompanying speed difference occur between the booster input side and the booster output side, as in the case of a torsional vibration, for example, the force in the form of compression, expansion, torsion or other energy storage can be absorbed by the correspondingly designed second energy storage element and can be passed on to the booster output side with a time delay, e.g., (almost) dissipation-free. This means that the rollers are permanently under pretensioning and rattling is reduced or prevented. Furthermore, a rest position or nominal position is ensured or re-established. Furthermore, a stop (e.g., shock-free for designed torque peaks) can be created for maximum relative rotation between the booster input side and the booster output side.

It is further proposed in an example embodiment of the booster clutch that the pilot-control input side is formed in one piece from the booster output side.

For this purpose, the booster output side is arranged axially between the pilot-control counter-plate and the pilot-control contact plate, with the booster output side then being configured as a (pilot-control) friction disk in this embodiment. For example, a friction lining. e.g., two friction linings on both axial sides, is then applied to the booster output side, which come into frictional contact with the pilot-control counter-plate and the axially opposite pilot-control contact plate.

In an example embodiment, the at least one rocker element and the booster output side are arranged in a common axial installation space between a booster input side, the booster input side having two disks connected to one another in a torsionally fixed manner, for example with a spacer bolt. The at least one first energy storage element may be arranged between the at least one rocker element, and the optional second energy storage element may be arranged between the booster output side and the booster input side radially outside the first energy storage element and the at least one rocker element. The at least one second roller is arranged radially outside the at least one rocker element, e.g., on (at least approximately) the same circumferential circle. This circumferential circle is a circle to which the spring axis is oriented tangentially and on which the second roller axis lies on average. The at least one friction lining is arranged radially outside the at least one rocker element and the at least one second roller.

It is further proposed in an example embodiment of the booster clutch that the pilot-control output side with a first torsional rigidity and the drum with a second torsional rigidity are connected to an output in a torque-transmitting manner, and the first torsional rigidity is greater than the second torsional rigidity.

In one embodiment, slipping phases occur in the frictional contact between the at least one rocker element and the drum during loading so that the ramp mechanism can move up to the transmission-ratio ramp pairing. When the load is relieved, the system must move back the distance it has traveled, counteracting the friction torque that is now acting in the opposite direction, in order to release the tension in the system. Self-locking of this movement occurs when the maximum friction torque is greater than the horizontal component of the normal force in the roller ramp contact, i.e., when the product of the cosine of the slope angle of the ramp pairing, the normal force and the coefficient of friction is greater than the product of the normal force and the sine of the slope angle of the ramp pairing. This is the case when the (friction angle) ratio of the friction coefficient (numerator) and the tangent of the slope angle of the ramp pairing (denominator) is greater than one.

This is the case if a gain greater than factor 2 [two] is to be achieved for the force transmission. The gain factor is the ratio of the maximum transmittable torque of the drum clutch (numerator) and the maximum transmittable pilot-control torque of the pilot-control clutch (denominator).

However, the tension in the system can be released at any time if the maximum transmittable pilot-control torque of the pilot-control clutch is limited to an amount smaller than the product of the normal force and the sine of the slope angle of the ramp pairing or smaller than the product of the pressing force last stored before release of the drum clutch and the tangent of the slop angle of the ramp pairing. It follows that in order to avoid self-locking, the second torsional rigidity (between the drum and the output) must be less than the first torsional rigidity (between the pilot-control output side and the output). At the same time, the ratio of the two torsional rigidities must be smaller than the friction angle ratio so that the drum torque of the drum clutch can be reliably controlled via the pilot-control torque of the pilot-control clutch.

According to a further aspect, a drive train is proposed, having at least the following components: at least one drive machine for outputting a torque: at least one consumer for receiving a torque: a transmission for transmitting a torque between the at least one drive machine and a consumer; and a booster clutch in accordance with an embodiment according to the above description. A torque can be transmitted between the at least one drive machine and the consumer by means of the booster clutch.

The drive train proposed here includes a first drive machine, for example an internal combustion engine with an internal combustion engine shaft and a transmission for transmitting torque between the internal combustion engine shaft and a consumer, for example the drive wheels in a motor vehicle. By means of the booster clutch, which is designed in accordance with an embodiment according to the above description, the torque transmission can take place between the internal combustion engine and the consumer, with a small (external) force or pressure having to be used to actuate the booster clutch. An actuating device can therefore be implemented with a small installation space requirement and/or cost-effectively. Torque transmission between the consumer and the internal combustion engine shaft may be possible in both directions, for example in a motor vehicle to accelerate the motor vehicle (traction mode) and in the opposite direction (overrun mode), for example to use the engine brake to decelerate the motor vehicle.

In an example embodiment of the drive train, an electric drive machine with a rotor shaft is also connected to the torque flow on the output side of the booster clutch and upstream of the consumer. For example, when the booster clutch is open, the consumers can operate purely electrically. In one embodiment, the electric drive machine and the booster clutch together form what is termed a hybrid module, which can be easily integrated into the drive train as a structural unit.

With the drive train proposed here, which includes the booster clutch described above, a high torque can be transmitted between the internal combustion engine and the transmission with reduced pressing force, while at the same time requiring little axial installation space.

According to a further aspect, a motor vehicle is proposed, including a drive train in accordance with an embodiment according to the above description and at least one drive wheel, and the at least one drive wheel can be driven by means of the drive train to propel the motor vehicle.

The installation space is small in motor vehicles due to the increasing number of components and it is therefore advantageous to use a small-sized drive train. With the desired what is termed downsizing of the drive machine and simultaneous reduction in operating speeds, the intensity of the disruptive torsional vibrations is increased. A similar problem arises with what is termed the hybridization, in which an electric drive machine is used more and more frequently or even forms the main source of torque and the smallest possible internal combustion engine is to be used, which, however, must be connected and disconnected again from the drive train more frequently. It is therefore a challenge to provide sufficient leveling of rotational irregularities and a sufficient actuating force with simultaneously low parts costs and little available installation space.

This problem is exacerbated in the case of passenger cars in the small car category according to the European classification. The assemblies used in a passenger car of the small car category are not significantly reduced in size relative to passenger cars of larger car categories. Nevertheless, the available installation space for small cars is considerably smaller.

In the motor vehicle proposed here, the drive train of which includes the booster clutch described above, a high torque can be transmitted between the internal combustion engine and the transmission with reduced pressing force, while at the same time a small axial installation space is required.

Passenger cars are assigned to a vehicle category according to, for example, size, price, weight, and performance, wherein this definition is subject to constant change based on the needs of the market. In the US market, vehicles in the small car and microcar categories are assigned to the subcompact car category according to European classification, while in the British market they correspond to the super-mini car and city car categories respectively. Examples of the microcar category are a Volkswagen up! or a Renault Twingo. Examples of the small car class are an Audi A1, Volkswagen Polo, Opel Corsa or Renault Clio. Known hybrid vehicles are the BMW 330e or the Toyota Yaris Hybrid. Known mild hybrids are, for example, an Audi A6 50 TFSI e or a BMW X2 xDrive25e.

BRIEF DESCRIPTION OF THE DRAWINGS

The above disclosure is explained in detail below against the relevant technical background with reference to the associated drawings, which show example embodiments. The disclosure is in no way restricted by the purely schematic drawings, and it should be noted that the drawings are not dimensionally accurate and are not suitable for defining proportions. In the drawings.

DETAILED DESCRIPTION

Figure 1:
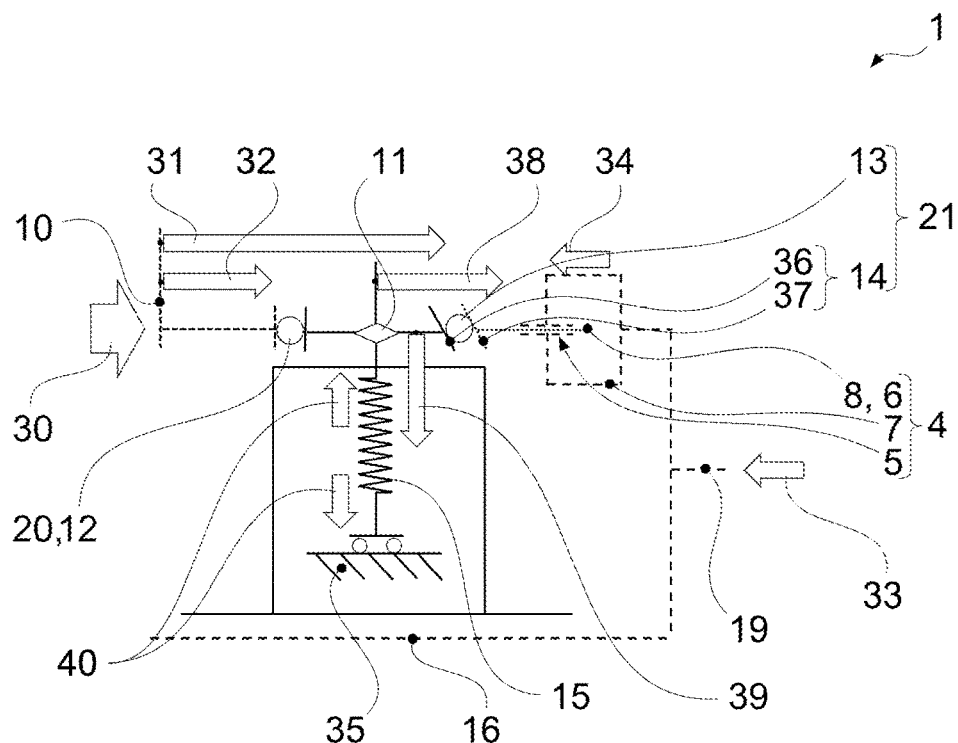
FIG. 1 shows a circuit diagram of a booster clutch in the unreinforced state.

FIG. 1 shows a circuit diagram of a booster clutch 1 in an example embodiment. The circuit diagram is a translational replacement model. The (straight) horizontal arrows correspond to the direction of rotation 22 in a real implementation (as shown, for example, in FIG. 3 or FIG. 4). In the real implementation, the vertical arrows correspond to the radial direction. An input torque 30 is applied to the booster input side 10 and results in a (total) torsion angle 31, and initially an input-side torsion angle 32 acts on the input side of the rocker element 11 designed here (purely optionally) as a pure force side 20 with a first roller 12 independently of the relative vertical (i.e., radial) position. If the pilot-control clutch 4 is open, the rocker element 11 is simply rotated to the right as shown. Only when the pilot-control clutch 4 is closed (sufficiently strongly), i.e., the friction pack 5 is pressed, the pilot-control input side 6 is fixed to the pilot-control output side 7 and thus the booster output side 8 is fixed. The pilot-control input side 7 is connected to the output 19, to which an output torque 33 that is antagonistic to the input torque 30 is applied, and results in a pilot-control torque 34 on the pilot-control output side 7. The rocker element 11 is mounted against a radial support 35. This radial support 35 is, for example, formed by the booster input side 10, the booster output side 8 or the output 19. Alternatively or additionally, the rocker element 11 is supported by itself or an adjacent further rocker element 11 (cf. FIG. 3).

Figure 2:
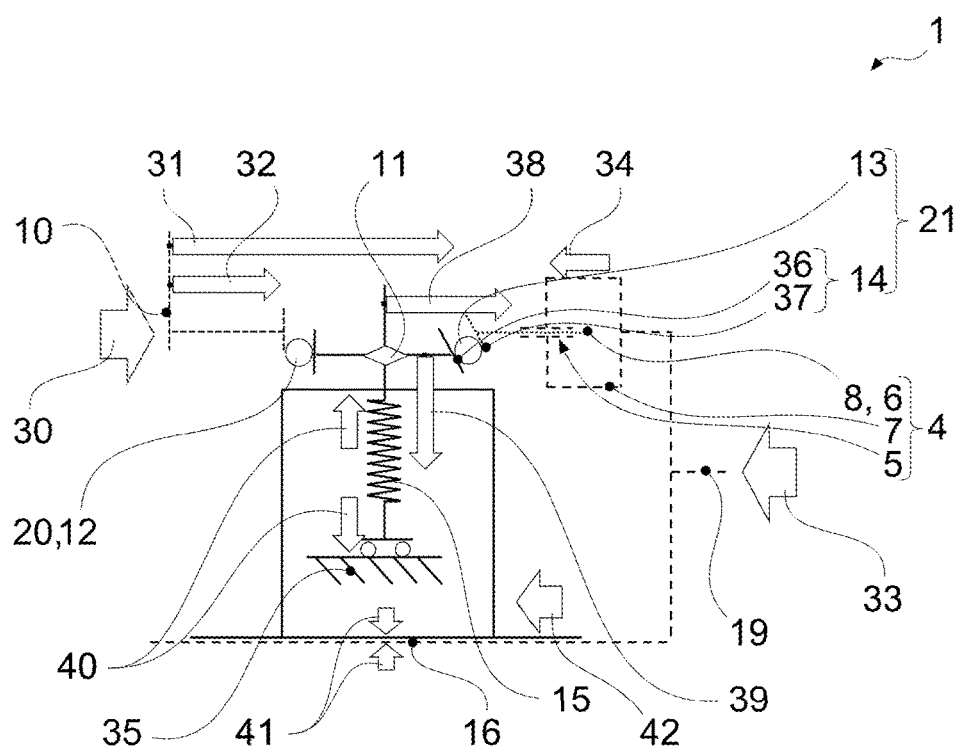
FIG. 2 shows the circuit diagram according to FIG. 1 in the reinforcing state.

In FIG. 2 the circuit diagram according to FIG. 1 is shown in the reinforcing state.

Here too there is an input torque 30 on the booster input side 10 and results in an (overall) torsion angle 31. The pilot-control clutch 4 is closed here (sufficiently strongly), i.e., the friction pack 5 is pressed. Therefore, the pilot-control input side 6 is fixed to the pilot-control output side 7 and thus also the booster output side 8 is fixed. Therefore a rolling of the second roller 13 takes place on the output side of the rocker element 11 configured on the (here purely optionally as the only) track side 21 by means of the ramp pairing 14 of the (rocker-side) rocker track 36 and the counter-track 37 (on the pilot-control side), which results in a vertical (i.e., radial) movement of the rocker element 11. This results in a relative torsion angle 38 between the rocker element 11 and the booster output side 8, i.e., the pilot-control input side 6. The rocker element 11, due to a sufficiently large torsion angle on the rocker side 38, covers such a large drum engagement distance 39 (vertical, i.e., radial movement) counter to the (first) spring force 40 that the rocker element 11 is pressed vertically (radially) against the drum 16 and is thus connected in a torque-transmitting manner to the output 19. This results in a pressing force 41 between the rocker element 11 and the drum 16 and thus a frictional booster torque 42 (to the left as shown). On the force side 20 of the rocker element 11, there is only a displacement of the first roller 12 there. The force (or the input torque 30) and the path (or the input-side torsion angle 32) are transmitted without a transmission ratio.

The booster clutch 1 is therefore closed via the pilot-control clutch 4 by part of the input torque 30, namely controlled by means of the pilot-control clutch 4 (or, if the torque direction is reversed, by the output torque 33). The maximum transmittable torque is increased. The (maximum) transmittable torque remains controllable in every state using the pilot-control clutch 4.

Figure 3:
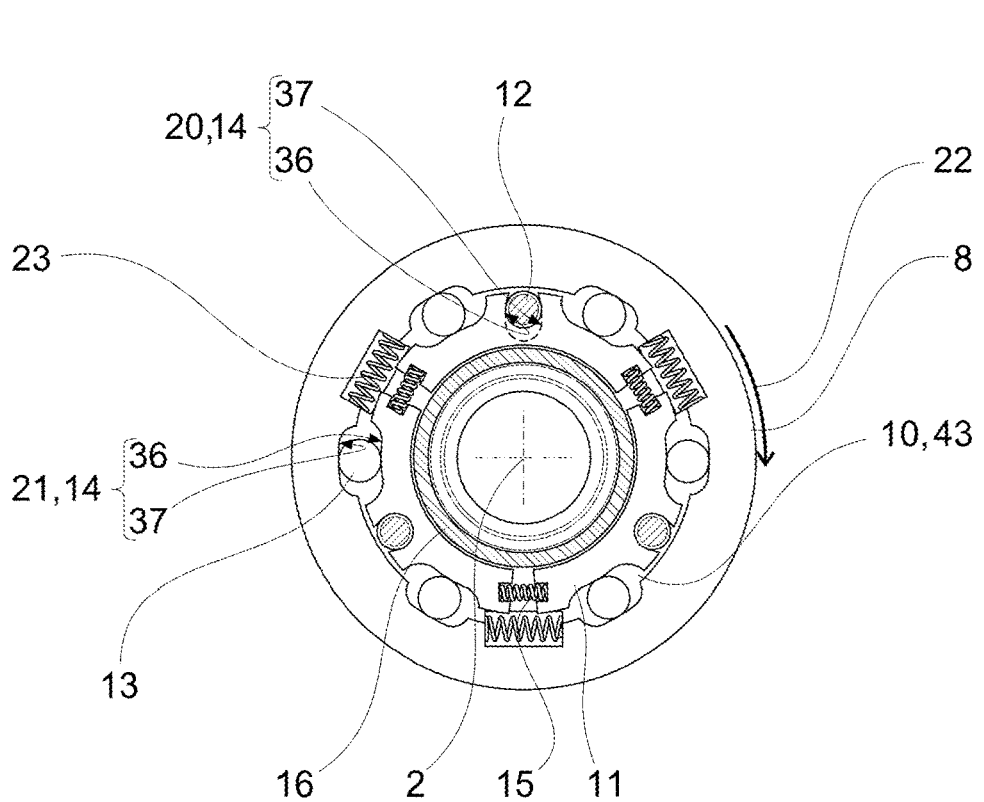
FIG. 3 shows a detail of a booster clutch from the drum to the booster output side.

In FIG. 3, the booster input side 10 to the booster output side 8 of a pilot-control clutch 4 is shown in a schematic sectional front view, with the rotational axis 2 being oriented normal to the image plane. The booster output side 8 is formed radially externally by a ring disk. The drum 16 is shown radially internally as a cut ring. In this embodiment, the (for example, second) disk 43 of the booster input side 10 can be seen in the background (purely optionally) from even further radially inwards to the (also purely optionally) radial overlap with the ring disk of the booster output side 8. (Here optionally three) rocker elements 11 are arranged radially between the ring disk of the booster output side 8 and the drum 16 and, in the shown (open) state, radially internally maintain a defined radial gap with respect to the drum 16. In this embodiment, an input-side force side 20 with a (purely optionally only) first roller 12 (here, for the sake of clarity, only the top one in the picture is labeled as pars pro toto) and an output-side track side 21 with (purely optionally two) second rollers 13 (here, for the sake of clarity, only the one on the left in the picture is labeled as pars pro toto) are each formed on the rocker elements 11.

Between the booster input side 10 and the booster output side 8. (purely optionally three) second energy storage elements 23 are supported in a torque-transmitting manner and form a stop for a maximum torsion angle between the two sides. The second energy storage elements 23 are sufficiently soft for a desired booster characteristic of the booster clutch 1. The rocker elements 11 are (purely optionally) supported against each other by means of a corresponding number of first energy storage elements 15 on one another. These first energy storage elements 15 have both a radial force component and a force component in the direction of rotation 22 so that their (antagonistic) force must be overcome in order to press the rocker elements 11 radially inwards against the drum 16 for a frictional connection. In one embodiment, this is a pure protection against unwanted slipping when the booster clutch 1 is held in the open state. In another embodiment, a defined torque range is also provided in which a torque is transmitted solely from the pilot-control clutch 4 (cf. FIG. 4).

If there is a torque over the booster input side 10 and the booster output side 8, which is only the case with a pressed pilot-control clutch 4 (cf. FIG. 4), the booster input side 10 rotates relative to the booster output side 8. The rocker elements 11 are each entrained by means of the first rollers 12 (force side 20). The relative rotation of the rocker elements 11 with respect to the booster output side 8 in turn forces the second rollers 13 to roll on the rocker track 36 and the complementary counter-track 37 of the relevant ramp pairing 14. Due to the slope angle (not clearly visible here) deviating from a pure direction of rotation 22, a radially inward movement of the rocker element 11 is forced against the stored force of the first energy storage elements 15. As a result, (after said radial gap is overcome) the rocker elements 11 are pressed again the drum 16, so the drum clutch is closed.

In the case of the first rollers 12, the force resulting from (part of) the applied torque in the direction of rotation 22 continues to be transmitted and (for example only) the changing relative radial position of the rocker elements 11 with respect to the booster input side 10 is balanced by rolling. For this purpose, a first roller 12 runs on a rocker track 36 and a (hidden here and therefore shown in dashed lines) complementary counter-track 37 of the relevant ramp pairing 14. This ramp pairing 14 may be designed without a transmission ratio, but to be neutral. The rollers 12, 13 are shown here in a neutral position (without applied torque). A reversal of the torque direction leads to an opposite rotation, which, with negligible hysteresis due to an inevitable zero crossing, is not noticeable during torque transmission and is also not audible due to the gentle closing of the drum clutch.

Figure 4:
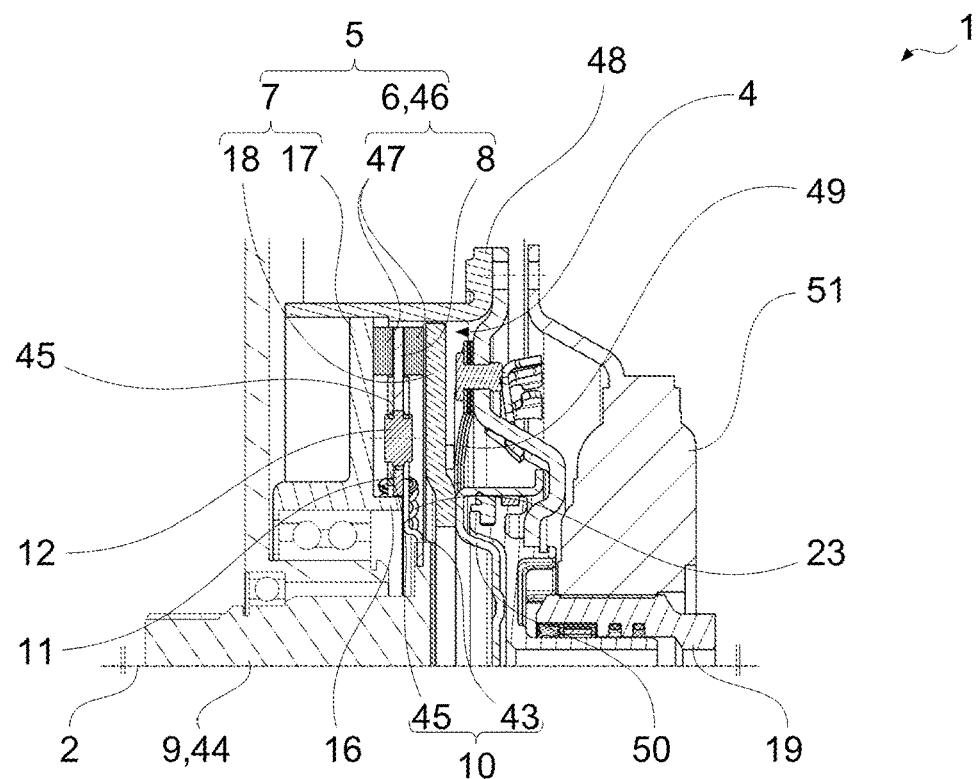
FIG. 4 shows a booster clutch in a sectional view.

FIG. 4 shows a booster clutch 1 in a sectional view, with the rotational axis 2 being shown at the bottom of the illustration. On the left in the illustration is an input shaft 9, for example an internal combustion engine shaft 44 or a corresponding connection, which is connected to a second disk 43 of a booster input side 10 in a torsionally fixed manner. The second disk 43 is connected to the first disc 45 in a torsionally fixed manner (not visible in section). The booster input side 10 is connected in a torque-transmitting manner to a rocker element 11 via the first roller 12 in section. The rocker element 11 is connected in a torque-transmitting manner via a second roller 13, not visible in this section, to the booster output side 8. The disks 45, 43 of the booster input side 10 are also connected via a second energy storage element 23 to the booster output side 8. A drum 16 is arranged radially within the rocker elements 11 at a distance with a defined radial gap, and in this case the drum 16 is formed (purely optionally) in one piece with the pilot-control counter-plate 17. The components of the drum 16 up to the booster output side 8 are at least in principle connected to each other in a torque-transmitting manner as explained in FIG. 3.

In this embodiment, the pilot-control friction disk 46 is formed by the disk-like booster output side 8 (or the entire drum clutch), with a friction lining 47 being attached on each of the two sides of the booster output side 8. The friction linings 47 can be pressed between the (axially rigid) pilot-control counter-plate 17 and the (axially movable) pilot-control contact plate 18. The pilot-control counter-plate 17 is connected via a co-rotating clutch cover 48 to an output 19 (for example a transmission input shaft) in a torsionally fixed manner. The pilot-control contact plate 18 is connected in a torsionally fixed and axially movable manner to the co-rotating clutch cover 48 and thus to the output 19 via a third energy storage element 49 (here a leaf spring assembly). The pilot-control contact plate 18 can be actuated by means of a (purely optionally hydraulic) slave piston 50.

Figure 5:
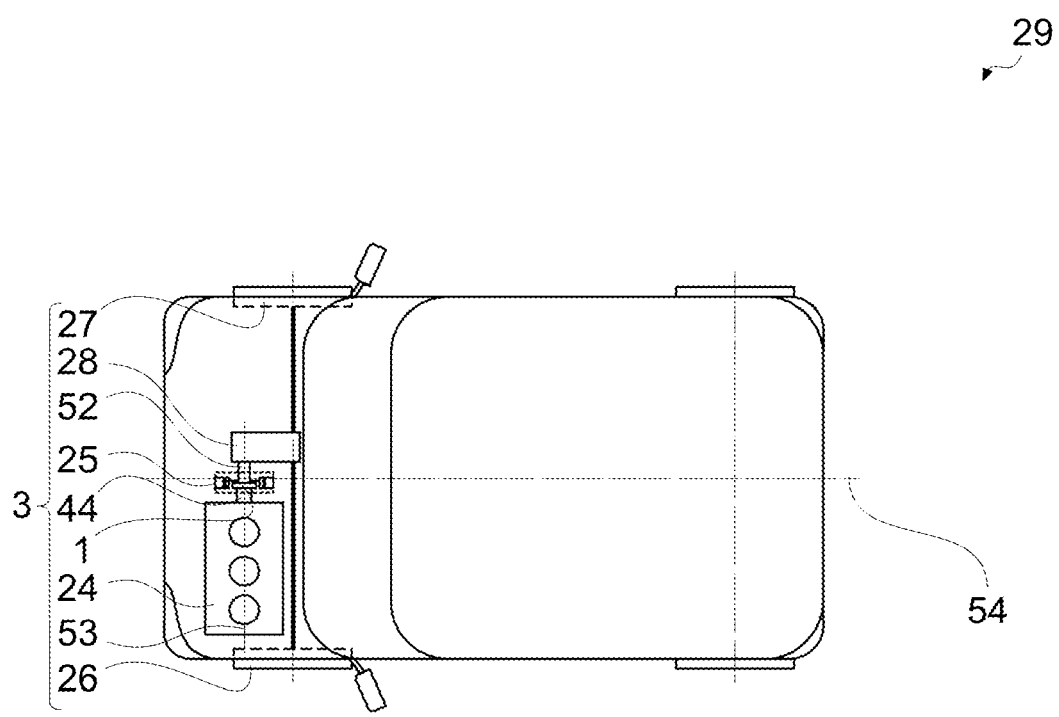
FIG. 5 shows a motor vehicle with a drive train.

The friction pack 5 of the pilot-control counter-plate 17, pilot-control friction disk 46 and the pilot-control contact plate 18 is designed here to be normally open, with the friction pack 5 being held open (passively) by the third energy storage element 49 and being closable (actively and controllably) by the actuating force of the slave piston 50. In the embodiment shown, a torsional vibration damper 51, which is not further specified here, is also provided (purely optionally) on the output 19. The co-rotating clutch cover 48 is (purely optionally) a connection for a rotor shaft 52 (ref. FIG. 5), e.g., for directly accommodating the rotor magnets of an electric drive machine 25. The shown booster clutch 1 may be integrated in a hybrid module.

FIG. 5 shows a motor vehicle 29 purely schematically with a drive train 3 in a top view, with a first drive machine 24, for example an internal combustion engine 24, with its internal combustion engine shaft 44 and a corresponding motor axis 53 and an electric drive machine 25 with its rotor shaft 52 coaxial to the motor axis 53 as well as transverse to the longitudinal axis 54 of the motor vehicle 29 and in front of the driver's cab of the motor vehicle 29 being disposed in a transverse frontal arrangement and included in the drive train 3.

Furthermore, the drive train 3 includes a transmission 28 for transmitting torque between the internal combustion engine shaft 44 and two consumers 26, 27, in this exemplary embodiment the left drive wheel 26 and the right drive wheel 27. Using a booster clutch 1 within the transmission 28, the torque transmission can be transmitted between the internal combustion engine 24 and the consumers 26, 27, with only a low (external) force or pressure having to be used to actuate the booster clutch 1.

With the booster clutch proposed here, a high torque can be transmitted with reduced pressing force, while at the same time a small axial installation space is required.

REFERENCE NUMERALS

1 Booster clutch
2 Rotational axis
3 Drive train
4 Pilot-control clutch
5 Friction pack
6 Pilot-control input side
7 Pilot-control output side
8 Booster output side
9 Input shaft
10 Booster input side
11 Rocker element
12 First roller (input)
13 Second roller (ramp)
14 Ramp pairing
15 First energy storage element
16 Drum
17 Pilot-control counter-plate
18 Pilot-control contact plate
19 Output (transmission input shaft)
20 Force side
21 Track side
22 Direction of rotation
23 Second energy storage element
24 Internal combustion engine
25 Electric drive machine
26 Left drive wheel
27 Right drive wheel
28 Transmission
29 Motor vehicle
30 Input torque
31 Overall torsion angle
32 Input-side torsion angle
33 Output torque
34 Pilot-control torque
35 Radial support
36 Rocker track
37 Counter-track
38 Rocker-side torsion angle
39 Drum engagement distance
40 First spring force
41 Pressing force
42 Booster torque
43 Second disk
44 Internal combustion engine shaft
45 First disk
46 Pilot-control friction disk
47 Friction lining
48 Clutch cover
49 Third energy storage element (leaf spring)
50 Slave piston
51 Torsional vibration damper
52 Rotor shaft
53 Motor axis
54 Longitudinal axis

The invention claimed is:

1. A booster clutch having a rotational axis for a drive train, comprising:
   a pilot-control clutch having a friction pack, the friction pack comprising a pilot-control input side and a pilot-control output side, a torque being frictionally transmittable in a pressed state between the pilot-control input side and the pilot-control output side;
   a booster output side which is connected in a torsionally fixed manner to the pilot-control input side;
   a booster input side that can be connected in a torsionally fixed manner to an input shaft;
   at least one rocker element, which is arranged in a torque-transmitting manner in the torque flow between the booster input side and the booster output side;
   at least one roller, which is arranged in a torque-transmitting manner via a ramp pairing between a corresponding one of the rocker elements and the booster input side or the booster output side; and
   at least one first energy storage element, the at least one first energy storage element either being:
      arranged in a torque-transmitting manner between a corresponding one of the rocker elements and the booster output side or the booster input side; or
      arranged to transmit radial force to the at least one rocker element,
   wherein:
      a drum is also included, and,
      when a predetermined torque is applied over the booster input side and the booster output side as a result of a rolling of the at least one roller on the ramp pairing, the at least one rocker element is pressed radially against the drum.

2. The booster clutch according to claim 1, wherein the drum is connected in a torque-transmitting manner to the pilot-control output side.

3. The booster clutch according to claim 1, wherein at least one second energy storage element is provided, which is arranged in a torque-transmitting manner between the booster input side and the booster output side.

4. The booster clutch according to claim 1, wherein the pilot-control input side is formed in one piece from the booster output side.

5. The booster clutch according to claim 1, wherein;
   the pilot-control output side with a first torsional rigidity and the drum with a second torsional rigidity are connected to an output in a torque-transmitting manner, and
   the first torsional rigidity is greater than the second torsional rigidity.

6. A drive train, comprising:
   at least one drive machine for delivering a torque;
   at least one consumer to absorb a torque;
   a transmission for transmitting a torque between the at least one drive machine and the at least one consumer; and
   a booster clutch according to claim 1, wherein a torque is transmittable between the at least one drive machine and the consumer by means of the booster clutch.

7. A motor vehicle, comprising a drive train according to claim 6 wherein the at least one consumer is at least one drive wheel, the at least one drive wheel being drivable by means of the drive train to propel the motor vehicle.

8. A booster clutch for a drive train, comprising:
a pilot-control clutch comprising a friction pack, the friction pack comprising a pilot-control input side and a pilot-control output side, wherein a torque is frictionally transmittable between the pilot-control input side and the pilot-control output side when the friction pack is in a pressed state;
a booster output side torsionally fixed to the pilot-control input side;
a booster input side arranged to be torsionally fixed to an input shaft;
a rocker element arranged in a torque-transmitting manner in a torque flow between the booster input side and the booster output side;
a first roller arranged in a torque-transmitting manner via a ramp pairing between the rocker element and:
the booster input side; or
the booster output side;
a first energy storage element:
arranged in a torque-transmitting manner between the rocker element and:
the booster output side; or
the booster input side; or
arranged to transmit a radial force to the rocker element; and
a drum, wherein the first roller rolls on the ramp pairing to apply a predetermined torque over the booster input side and the booster output side and press the rocker element radially against the drum.

9. The booster clutch of claim 8, wherein the drum is formed in one piece with a pilot-control output component.

10. The booster clutch of claim 8, wherein the drum is formed in one piece with an output.

11. The booster clutch of claim 8, wherein:
the rocker element has a force side and a track side;
the force side is arranged on an input side of the rocker element and comprises the first roller for radially neutral transmission of a force in a direction of rotation; and
the track side comprises a second roller with a transmission-ratio ramp pairing.

12. The booster clutch of claim 8 further comprising a second energy storage element arranged in a torque-transmitting manner between the booster input side and the booster output side.

13. The booster clutch of claim 8, wherein the pilot-control input side is formed in one piece with the booster output side.

14. The booster clutch of claim 8, wherein:
the pilot-control output side is connected to an output with a first torsional rigidity in a torque transmitting manner;
the drum is connected to the output with a second torsional rigidity in a torque transmitting manner; and
the first torsional rigidity is greater than the second torsional rigidity.

* * * * *